Dec. 6, 1955
2,726,173
METHOD AND APPARATUS FOR MEASURING FILM THICKNESS
Filed April 3, 1953
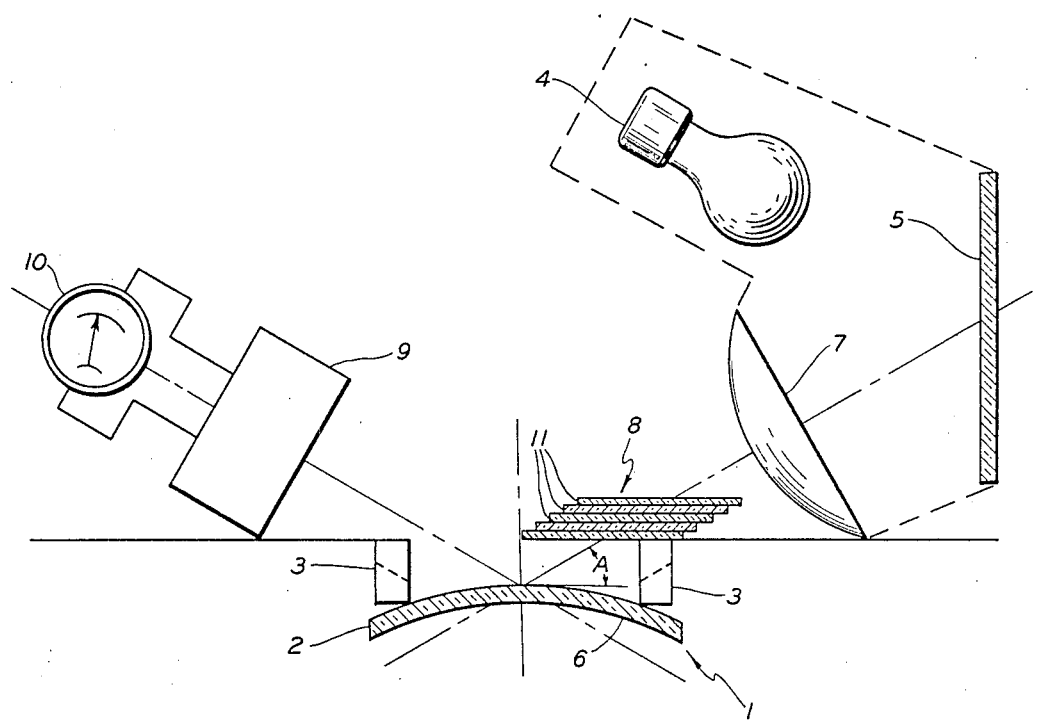
INVENTOR.
GREGORY L. MARTIN
BY
Lockwood, Galt, Woodard, & Smith
ATTORNEYS //patents.google.com/patent/US2726173

United States Patent Office 2,726,173
Patented Dec. 6, 1955

2,726,173

METHOD AND APPARATUS FOR MEASURING FILM THICKNESS

Gregory L. Martin, Culver City, Calif., assignor to International Telephone and Telegraph Corporation, a corporation of Maryland Application April 3, 1953, Serial No. 346,741

8 Claims. (Cl. 117—106)

The present invention relates to a method and apparatus for measuring film thickness, and more particularly to a method which employs reflected light for controlling the thickness of translucent film employed in the fabrication of photocathodes.

In the production of photoelectric tubes having relatively thin translucent layers of photosensitive material on a transparent supporting base, it is necessary, in the usual case, to apply the base upon which the photosensitive material is deposited within tolerance thickness dimensions in order to obtain the desired operating characteristics. Heretofore, measurement of the thickness of such layers has been satisfactorily obtained by measuring the light transmitted by the layer, the transmission factor being a function of the thickness. While this method is generally satisfactory, it is not convenient, nor even possible, in some instances, to measure the layer thickness by reason of peculiar tube design, thereby requiring the use of some other method for determining accurately when the desired thickness has been achieved.

It is therefore an object of this invention to measure the thickness of cathode materials applied to a refractive supporting base by the use of reflected light instead of transmitted light.

It is another object of this invention to measure the thickness of reflective material applied to one surface of a two surface, transparent plate by the use of apparatus which directs a ray of light onto the plate and which utilizes only the light reflected by the material by eliminating the light normally reflected by the uncoated surface.

In accordance with this invention, the method of providing a coating of reflective material onto a refractive base includes the steps of directing a beam of light toward the uncoated surface of said base, gradually applying a film of such material on the opposite surface, eliminating light normally reflected by the uncoated surface, and then measuring the amount of light reflected by the coated surface.

An apparatus for accomplishing the method of the foregoing paragraph is comprised of a source of light directed onto the uncoated surface, a filter for eliminating light normally reflected by said uncoated surface, and photosensitive means for intercepting the light reflected by the coated surface which varies in quantity as the thickness of the film changes.

For a better understanding of the invention, together with other and further objects thereof, reference is made to the following description, taken in connection with the accompanying drawing, the scope of the invention being defined by the appended claims:

In the accompanying drawing:

The figure is a diagrammatical illustration of one apparatus embodying the principles of this invention.

Referring to this drawing, only the face plate 1 of a photosensitive vacuum tube is shown, this face plate being of conventional transparent composition and in the present instance being composed of a convexly shaped glass disk on the underside 2 of which is to be applied the usual photosensitive cathode material. Since silver is a common ingredient of such photosensitive materials, the following description will make particular reference to the application of silver films to the side 2 of the face plate, but it will be understood, of course, that this invention may be practiced in the application of films of other material so long as such other material is reflective of light to some degree.

In the illustrated apparatus, the face plate 1 is located against suitable spaced abutments 3. A light source 4, properly shielded by means of an enclosure or the like (shown in dashed lines) to prevent wide spread irradiation, as will become apparent from the following description, is positioned to direct a beam of light onto a mirror 5 which reflects this beam onto the uncoated surface 6 of the face plate 1 through a suitable collimating lens 7 and a light-polarizing filter 8. Without the polarizer 8, a part of the collimated beam of light would be reflected from the surface 6. A suitable photosensitive device such as the photo cell 9 is positioned in the normal path of the light reflected from the face plate for a purpose which will be explained more fully hereafter. A suitable microammeter 10 is connected to the photo cell 9 for measuring the current developed thereby.

In the illustrated embodiment, the polarizer 8 is comprised of a stack of thin glass plates 11; however, as will become apparent, other light polarizing or filtering means may be used for achieving the desired end result. As is well known in the art of optics, a plain glass surface (or any similar refractive medium) has a critical angle of reflectance at which the light reflected from this surface is substantially polarized in a single plane. By varying the angle of incidence of a ray of light projected onto the surface from that of the critical angle, the degree of reflected polarization is correspondingly altered. Thus it is possible to eliminate reflected light from such a surface by the utilization of a suitable polarizing filter, such as the filter 8. As will now appear obvious, if the angle A, measured between the tangent of the surface 6 and the light beam, of the incident light is adjusted to the critical angle of the face plate surface 6, the filter 8 may be adjusted to eliminate the light which would normally be reflected by the surface 6. While this filter 8 has been shown as being interposed between the light source and the face plate surface 6, it will appear obvious that it may be used in between the photocell 9 and the surface 6 for eliminating the normal surface reflection.

From the foregoing, by proper adjustment of the light angle A and the filter 8, substantially all of the light normally reflected by the face plate surfaces may be prevented from reaching the photo cell 9. This is important in the present invention because it is desired to detect and measure only light reflected by the coated surface 2 of the face plate, and if the light normally reflected by the uncoated surfaces were allowed to impinge on the photo cell 9, the quantity of light measured by the photo cell would be the sum of the two reflections (from the coating and from the face plate) which would seriously affect proper operation of the apparatus.

With proper adjustments made, the incident light reflected by the face plate itself will be negligible. In operation, this reflected light has been reduced to one percent (1%) of the total. Therefore, the photocell "sees" only the light reflected by the applied coating, which is not affected by the presence of the filter 8.

In applying a film of silver to the face plate surface 2, the silver may be evaporated onto this surface in accordance with techniques well known in the art, and as this film thickens, the amount of light reflected from the surface 2 will be seen to correspondingly increase. As the light impinging on the photo cell increases in quantity the current flowing through the microammeter 10 will correspondingly increase and may therefore be calibrated in terms of film thickness.

In practicing the invention, care must be taken in correlating the response characteristics of the polarizer 8 and photo cell 9 so that the polarizer 8 eliminates all wave lengths within the spectral response of the photo cell. If, for example, a filter is used which is transmissive of infra-red light, and the photo cell used has considerable infra-red response, infra-red reflection from the uncoated face plate surface 6 will be detected and registered by the microammeter 10, this combination of operating features causing the apparatus to be insensitive and inaccurate. By the use of the glass plate polarizer, infra-red rays are controlled thereby facilitating the use of conventional photo cells which normally have considerable infra-red response. Other schemes for limiting the infra-red effects are of course well known to the art, for example, by using a polarizing material and a filter which limits the spectrum.

From the foregoing it will appear that reflected light may be reliably utilized to ascertain the thickness of a reflective material applied to one side of a refractive member having parallel surfaces. The basic requirement in the successful practice of this invention is the elimination of light normally reflected from the uncoated surface, which leaves for measurement only that light which is reflected by the film with the quantity of this latter reflected light being proportional to the thickness of the film. It is of course obvious that this invention has application to the production of translucent films as contrasted with impervious films which reflect the same quantity of light regardless of the thickness thereof. It may be said by varying the degree of translucency of the film, the quantity of light reflected from said film will correspondingly vary.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of providing a coating of reflective material on a refractive base having opposite surfaces comprising the steps of directing a beam of light toward one of said surfaces, gradually applying a film of said material on the other of said surfaces, directing the light which lies in the plane of polarization of said one surface through a light filter which is at least partially impervious thereto, but which is pervious to the light reflected from said film, and measuring the amount of light reflected by said film to determine the thickness of said film.

2. The method of providing a coating of reflective material on a refractive base having opposite surfaces comprising the steps of directing a beam of light toward one of said surfaces, gradually applying a film of said material on the other of said surfaces, directing the light reflected from said one surface and from said film toward a light-measuring device, filtering said light to at least partially eliminate the reflected light from said one surface but to transmit the light reflected from said film, measuring the amount of light reflected by said film to determine its thickness, and stopping the application of said film when the measured light attains a predetermined value.

3. The method of providing a coating of reflective material on a refractive base having opposite surfaces comprising the steps of directing a beam of light toward one of said surfaces, gradually applying a film of said material on the other of said surfaces, directing the light reflected from said one surface and from said film toward a photo cell, filtering said light to at least partially eliminate the reflected light from said one surface but to transmit the light reflected from said film, directing the transmitted light onto a photo cell, stopping the application of said film when the current through said photo cell attains a predetermined value.

4. The method of providing a coating of reflective material on a refractive base having opposite surfaces comprising the steps of directing a beam of light toward one of said surfaces at the plane polarizing angle thereof whereby light reflected from this one surface is polarized in a single plane, gradually applying a film of said material on the other of said surfaces, filtering said light to at least partially eliminate the light oriented in said single plane but to allow transmission of the light normally reflected from said film, and measuring the amount of light reflected from said film to determine the thickness thereof.

5. The method of providing a coating of reflective material on a refractive base having opposite surfaces comprising the steps of directing a beam of light toward one of said surfaces at the plane-polarizing angle thereof whereby light reflected from this one surface is polarized in a single plane, gradually applying a film of said material on the other of said surfaces, directing a beam of light through a polarizer which is adjusted to impede the passage of said polarized light but to transmit the light reflected from said film, directing the light reflected from said film onto a photo cell, and stopping the application of said film when the current through said photo cell attains a predetermined value.

6. An apparatus for measuring the thickness of a lamina of reflective material applied to one surface of a two surface transparent refractive medium comprising a light source which may be directed in a beam onto the uncoated surface of said medium at an angle at which light reflected from said uncoated surface will be substantially polarized, a light-polarizing filter interposed in the path of the light from said source and positioned to impede the transmission of light contained in the plane of said polarized light, and photosensitive means positioned to intercept the light reflected by said medium.

7. An apparatus for measuring the thickness of a lamina of reflective material applied to one surface of a two surface transparent refractive medium comprising a source of light directed onto the uncoated surface of said medium at the polarizing angle of said uncoated surface, means interposed in the path of said light which inhibits transmission of the light components lying in the plane of polarization of said uncoated surface, and photosensitive means positioned to intercept light reflected from said medium, the intercepted light being contained in planes which are angularly related to the plane of polarization of said uncoated surface.

8. An apparatus for measuring the thickness of a lamina of reflective material applied to one surface of a two surface transparent refractive medium comprising a light source, means co-operating therewith for directing a beam of light onto the uncoated surface of said medium at an angle at which light reflected from said uncoated surface will be substantially polarized, a light-polarizing filter interposed between said source and said uncoated surface for filtering out the light components contained in the polarizing plane of said one surface, and a photo cell positioned to measure the quantity of light reflected by said medium, said quantity of light being comprised principally of light reflected by the coated surface of said medium.

References Cited in the file of this patent

UNITED STATES PATENTS

| | | |
|---|---|---|
| 2,338,234 | Dimmick | Jan. 4, 1944 |
| 2,472,605 | McRae et al. | June 7, 1949 |

OTHER REFERENCES

Popular Mechanics, vol. 69, June 1938, page 838.